March 24, 1953  W. W. COGSWELL, SR., ET AL  2,632,277
FISHING LURE
Filed April 20, 1949

INVENTORS
Wilton W. Cogswell Sr.
& Walter F. Cogswell
BY
*W. A. McGrew*
ATTORNEYS Patented Mar. 24, 1953

2,632,277

UNITED STATES PATENT OFFICE 2,632,277

FISHING LURE

Wilton W. Cogswell, Sr., and Walter F. Cogswell, Colorado Springs, Colo., assignors to Bobopen, Inc., Colorado Springs, Colo., a corporation of Colorado Application April 20, 1949, Serial No. 88,558

6 Claims. (Cl. 43—42.39)

The present invention relates to a fishing lure. It has to do particularly, although not exclusively, with an improved fishing lure which may be formed from plastic and colored to suit the convenience of use.

One of the objects of the present invention is to provide an improved fishing lure which always gives action in the water and which lies and runs in flatwise condition during any pull of the line to which it is attached.

Another object of the present invention is to provide an improved fishing lure of the foregoing character which is capable of releasing itself from engagement with logs, stones, or other debris located on the bottom of the body of water being fished, it being a further object of the invention to provide such a lure which, when it releases itself, assumes a flatwise position and wiggles or oscillates in the water, thus serving to shake loose any weeds or grass which the hook or hooks of the lure may have collected.

A further object of the present invention is to provide an improved lure which may be manufactured by mass production methods at relatively low cost.

The foregoing and other objects and advantages of the present invention will appear from the following description and appended claims when considered in connection with the accompanying drawing forming a part of this specification wherein like reference numerals indicate similar parts in the several views.

Figure 1:
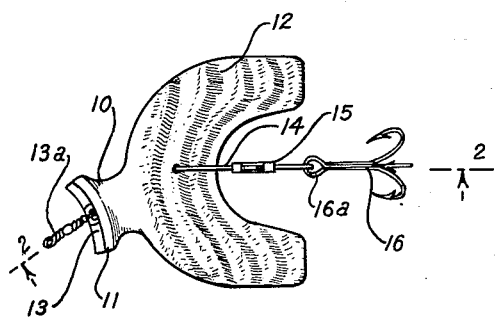
Fig. 1 is a top plan view of a lure embodying the present invention.

Before explaining in detail the present invention it is to be understood that the invention is not limited in its application to the details of construction and arrangement of parts illustrated in the accompanying drawing, since the invention is capable of other embodiments and of being practiced or carried out in various ways. It is to be understood also that the phraseology or terminology employed herein is for the purpose of description and not of limitation, and it is not intended to limit the invention claimed herein beyond the requirements of the prior art.

Referring now particularly to the drawing and especially to Figs. 1, 2, 3, 6 and 7 thereof, there is shown in these figures a preferred form of the lure of the present invention which comprises a body 10 having a forward portion 11 and a rearward portion 12 with their central axes arranged in offset relationship and with the forward body portion 11 being disposed in a plane substantially perpendicular to the normal substantially horizontal plane of the rearward portion 12.

Figure 2:
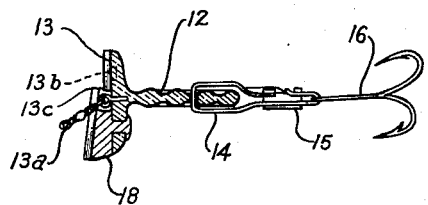
Fig. 2 is a sectional view taken substantially along the line 2—2 of Fig. 1, looking in the direction of the arrows.
Figure 3:
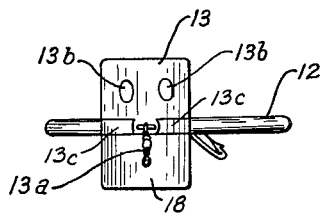
Fig. 3 is a front elevational view of the lure shown in Figs. 1 and 2.

The forward portion 11 is provided with an incurved or concave surface 13 facing in the direction of the intended movement of the lure. This face or surface 13 is provided with connecting means 13a for the attachment of a fishing line 17. The rearward portion 12 carries means, such as a wire or metal loop or member 14 having a socket portion or coupling member 15, which serves to movably and removably connect and support a preferably three-prong hook 16. The loop 14, see Fig. 2, is passed through a hole or opening in the rearward body portion 12 and extends through member 15 as shown, to permit the attachment and detachment of the eye 16a (see Fig. 1) of the hook 16. This permits the interchangeability of the hooks. As seen in Figs. 2 and 3, the concave or incurved face or surface 13 may be provided with sockets or recesses 13b to simulate fish eyes and with the transversely extending and preferably spaced ribs 13c, 13c disposed intermediate the upper and lower ends of said surface.

Figure 6:
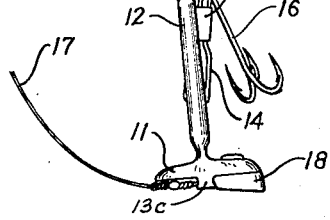
Fig. 6 is a side elevational view of the lure of Fig. 1 with the body portion thereof in upright position as if resting upon the bottom surface of a body of water.

The forward body portion 11 with its concave surface or face 13 extends at substantially a right angle to the rearward body portion 12 and carries at its lower end preferably a lead or other metal weight 18. This weight 18 tends to maintain the lure in a substantially horizontal position as seen in Fig. 2 when in use, except when the line 17 is slack, at which time the weighted portion 18 tends to tilt the lure into an upright position, as seen in Fig. 6, this latter position being assumed when the lure rests upon the bottom of the body of water being fished.

Figure 7:
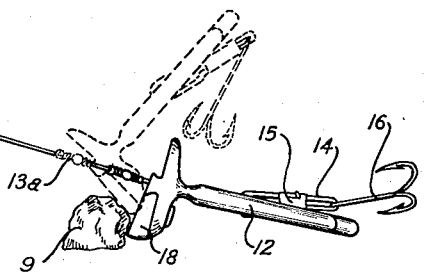
Fig. 7 is a side elevational view of the same illustrating the action of the lure of Figs. 1 and 6, shown releasing itself from an obstacle, such as a log.

As seen in Fig. 7, should the lure of the preceding views come in contact with a log, such as log 9, the weighted portion 18, when the line 17 is pulled, will cause the lure to tilt from its full line position of Fig. 7 to its broken line position in that figure to release it from the log 9, whereupon it will again assume its substantially horizontal position of Fig. 2.

By having the axes of the forward and rearward portions 11 and 12, respectively, of the lure offset, a pull on the line will cause the lure to constantly wiggle in a substantially horizontal plane during its movement through the body if water, thus tending to attract game fish which might not otherwise observe it.

Because of the detachable connection by virtue of the parts 14 and 15, the hook 16 may be replaced by a spinner, pork rind, or if desired, a buck tail hook. Moreover, by providing the wire loop 14 which may be lengthened or shortened as desired, the distance between the hook 16 and the line-attaching means or eyelet 13a may be varied.

Figure 4:
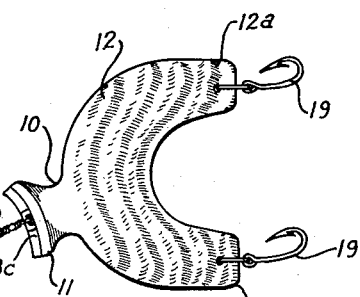
Fig. 4 is a top plan view of a modified form of lure embodying the present invention.

In accordance with the modified form of the present invention shown in Fig. 4 of the drawing, the rearward projecting end portions 12a of the rearward body portion 12 of the lure may each be provided with a single hook 19. Obviously, the single hooks 19 could be replaced with multiple hooks, such as the three-prong hook 16.

Figure 5:
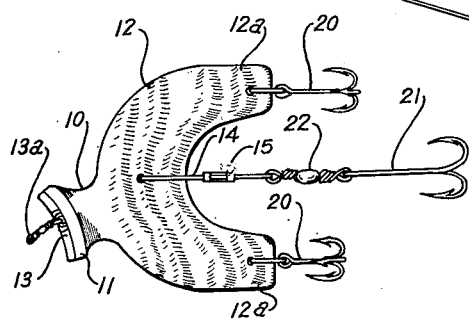
Fig. 5 is a top plan view of a lure and illustrating a further modified form of the present invention.

In accordance with the further modified form of the present invention shown in Fig. 5, the rearward extensions 12a of the rear body portion 12 may be provided with multiple hooks 20 and the rearward body portion intermediate the ends 12a, 12a may carry an assembly generally similar to that shown at 14, 15, 16 of Fig. 1, the present assembly, however, including a multi-prong hook 21 and a special connector or coupling means 22 for attachment to loop 14 so as to position the multi-prong hook 21 somewhat rearwardly of the hooks 20.

The bodies 10 of the several forms of the present invention are substantially identical, the difference in the several forms being primarily in the arrangement of hooks applied to and carried by them.

The weighted portion 18 of each of the forms of the present invention not only provides means for maintaining the lure in flatwise condition when in use but also provides the device with the necessary and proper weight for casting purposes. Since the lure will assume a flat position upon contact with the water and remain in such position, it sinks slowly toward the bottom, which makes for efficient use.

Another purpose which the weighted portion 18 serves is to cause a quick tilting movement, as shown in Fig. 7, away from the log 9, into an upright position so that the depending hooks pass freely over the obstruction. The offset axes of the forward and rearward portions, which arrangement causes the wiggling or constant oscillating movement of the lure, also serves to force the hook into the mouth of the fish when the fish strikes the sides of the rearward portion, due to swinging of the hook about its pivotal point of attachment. Thus, many fish are hooked which would be lost by the use of previously known and conventional types of fishing lures under similar conditions.

We claim:

1. A fishing lure comprising a member formed of plastic material having a body portion, a head portion and a reduced neck portion connecting said head portion to said body portion, said body portion being substantially flat and having U-shaped configuration, said head projecting below and above the plane of said body portion and having a concavo-convexed cross-sectional configuration which extends in an angular direction with respect to the longitudinal axis of the body, spaced ribs on the face of said head, said ribs being co-planar with said body portion, an eye secured to said head substantially in the plane of and between said ribs, and a weight secured to the concave face of said head to one side of said ribs, said weight having a curvature corresponding substantially to the face of said head.

2. A fishing lure comprising a member having a body portion, a head portion and a reduced neck portion connecting said head portion to said body portion, said body portion being substantially flat and having a U-shaped configuration, said head projecting below and above the plane of said body portion and having a concavo-convexed cross-sectional configuration which extends in an angular direction with respect to the longitudinal axis of the body, spaced ribs on the face of said head, said ribs being co-planar with said body portion, an eye secured to said head substantially in the plane of and between said ribs, and a weight secured to the concave face of said head to one side of said ribs, said weight having a curvature corresponding substantially to the face of said head.

3. A fishing lure comprising a member formed of plastic material having a body portion, a head portion and a reduced neck portion connecting said head portion to said body portion, said body portion being substantially flat and having a U-shaped configuration, said head projecting below and above the plane of said body portion and having a concavo-convexed cross-sectional configuration, spaced ribs on the face of said head, said ribs being co-planar with said body portion, an eye secured to said head substantially in the plane of and between said ribs, and a weight secured to the concave face of said head to one side of said ribs, said weight having a curvature corresponding substantially to the face of said head.

4. A fishing lure comprising a member having a body portion, a head portion and a reduced neck portion connecting said head portion to said body portion, said body portion being substantially flat and of bifurcated form said head projecting below and above the plane of said body portion and having a concavo-convexed cross-sectional configuration, spaced ribs on the face of said head, said ribs being co-planar with said body portion, a line attaching eye secured to said head substantially in the plane of and between said ribs, and a weight secured to the concave face of said head to one side of said ribs, said weight having a curvature corresponding substantially to the face of said head.

5. A fishing lure according to claim 4, wherein one portion of said weight has a greater thickness than the portion thereof adjacent the ribs formed on said head portion.

6. A fishing lure according to claim 4, wherein the upper section of the head portion has deep recesses formed therein to simulate eyes, and wherein said recesses are symmetrically arranged with respect to a vertical line passing through said line attaching eye.

WILTON W. COGSWELL, Sr.
WALTER F. COGSWELL.

REFERENCES CITED

The following references are of record in the file of this patent:

UNITED STATES PATENTS

| Number | Name | Date |
| --- | --- | --- |
| D. 154,098 | Carr | June 14, 1949 |
| 1,297,354 | Jay | Mar. 18, 1919 |
| 1,686,114 | Walter | Oct. 2, 1928 |
| 1,892,892 | Jamar | Jan. 3, 1933 |
| 2,036,075 | Peterson | Mar. 31, 1936 |
| 2,112,385 | Smith | Mar. 29, 1938 |
| 2,467,244 | Van Hee et al. | Apr. 12, 1949 |
| 2,512,913 | Boice | June 27, 1950 |